J. L. EARL.
ELECTROMAGNETIC BRAKE.
APPLICATION FILED MAR. 2, 1915.
1,148,157.
Patented July 27, 1915.
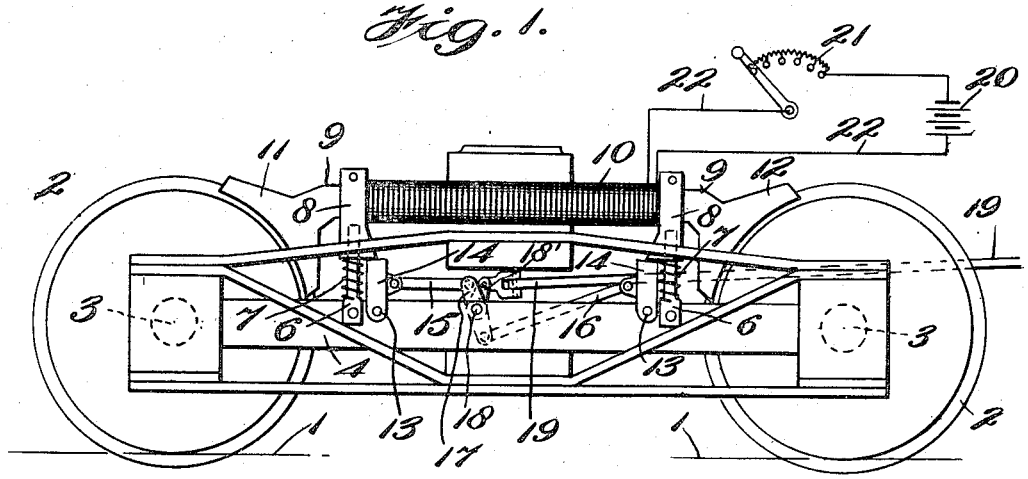
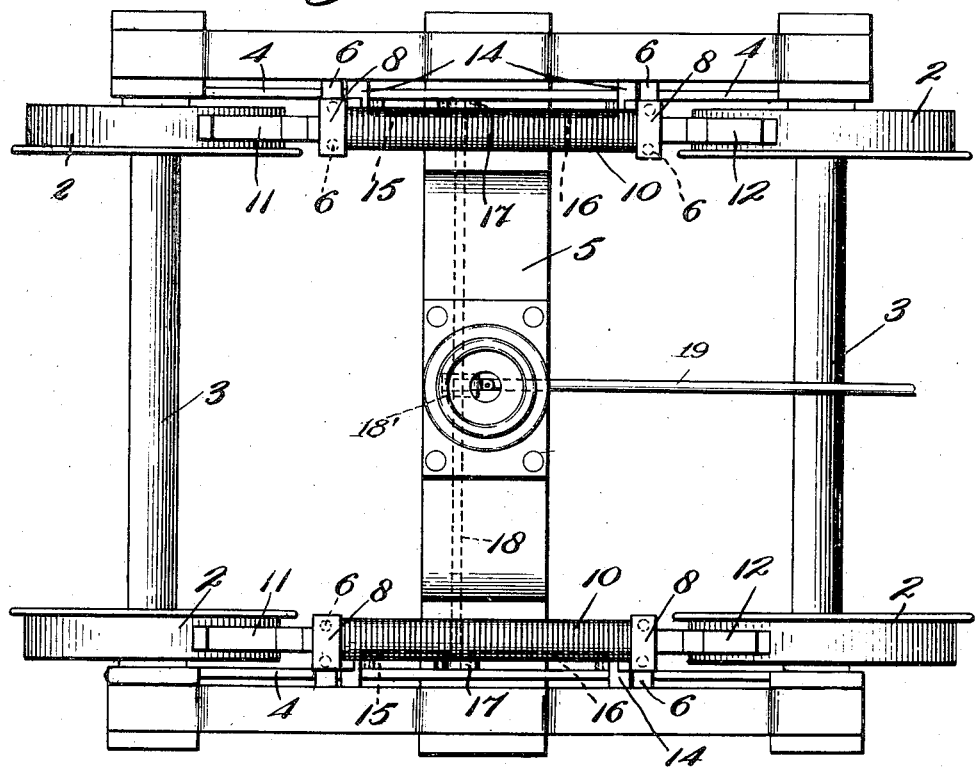
Witnesses
B. B. Collings.
M. C. Hanlahan.
Inventor
John L. Earl by
Wee Witherspoon
Attorney

UNITED STATES PATENT OFFICE.

JOHN LOUIS EARL, OF MORGAN CITY, LOUISIANA, ASSIGNOR OF SEVEN-EIGHTHS TO HERBERT M. COTTEN, OF MORGAN CITY, LOUISIANA.

ELECTROMAGNETIC BRAKE.

1,148,157.      Specification of Letters Patent.     Patented July 27, 1915.

Application filed March 2, 1915. Serial No. 11,605.

*To all whom it may concern:*

Be it known that I, JOHN LOUIS EARL, a citizen of the United States, and residing at Morgan City, in the parish of St. Mary and State of Louisiana, have invented certain new and useful Improvements in Electromagnetic Brakes; and I do hereby declare the following to be a full, clear, and exact description of the invention, such as will enable others skilled in the art to which it appertains to make and use the same.

This invention relates to magnetic brakes, and has for its object to provide an apparatus of this kind which will not only act as a positive brake, but which may be positively held out of contact with the wheels, and when in such position be employed inductively to increase the tractive effect of the wheels on the rails.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views—Figure 1 is a diagrammatic side elevational view of a magnetic brake, made in accordance with my invention; and Fig. 2 is a plan view of a portion of the parts shown in Fig. 1.

1 indicates any suitable track or rails on which the wheels 2 roll, 3 the axles of said wheels, 4 any suitable beams, bars or other connections between the axles 3, 5 any suitable cross connection between the beams 4, 6 supports attached to the beams 4 and provided with springs 7 on which rests the brackets 8 surrounding the core 9 of an electromagnet 10 having the poles 11 and 12. The electromagnet and parts just described are preferably duplicated on each side of the truck of the vehicle as illustrated in Fig. 2.

Underneath the brackets 8 are pivoted as at 13. the dogs 14 attached to one end of the rods 15 and 16 respectively. The other end of the rod 15 is attached to the upper end of a lever 17, while the other end of the rod 16 is attached to the lower end of said lever 17. The lever 17 is likewise preferably duplicated on each side of the truck, and a rod 18 connects the two levers 17 and serves as a pivot therefor. Connected to the levers 17 or to the rod 18 by any suitable means 18' is the operating rod 19 leading to the cab, under the control of the engineer.

20 illustrates any suitable source of current, 21 any suitable controller or rheostat and 22 the lead wires for supplying current to the magnet 10.

The operation of my invention will be clear from the foregoing, but may be briefly summarized as follows: The parts being in the position shown in Fig. 1, with the poles 11 and 12 out of contact with the wheels 2, if current is sent through the magnets 10 by manipulating the rheostat 21, the said poles 11 and 12 will through induction magnetize the wheels 2 and they in turn will magnetize the track 1 so that the traction between said wheels and track will be increased. On the other hand when it is desired to use the magnets 10 as a brake, the rod 19 may be pulled toward the right as seen in Fig. 1 whereupon the upper ends of the levers 17 will also be pulled toward the right, which will cause the rods 15 and 16 to move the dogs 14 out from under the brackets 8, and thereby permit the poles 11 and 12 to contact with the wheels 2. When said poles are thus in contact with the wheels 2 current may be sent through the magnets 10 and the said wheels magnetically gripped thus causing the said magnets to exert a braking action.

When it is desired to release the poles from the wheels 2, current is cut off, the springs 7 raise the poles 11 and 12 out of contact with the wheels 2, when a reverse motion of the rod 19 will reverse the motion of the dogs 14 and through the inclined surfaces of the upper ends of said dogs the said brackets 8 will be wedged upwardly, and held out of contact with the said wheels 2.

Of course any other suitable means for lifting the magnets 10 may be provided.

It is obvious that those skilled in the art may vary the details of construction, as well as the arrangement of parts without departing from the spirit of my invention and therefore I do not wish to be limited to the above disclosure except as may be required by the claims.

What I claim is:

1. In a magnetic brake the combination of an electro-magnet having a pole; means for yieldingly supporting said pole in close proximity to a car wheel adapted to roll on track rails; means to positively hold said pole out of contact with said wheel; means to energize said magnet pole when thus positively held to magnetize said wheel and track through induction; and means to release said positive holding means and permit said pole to contact with said wheel when a braking action is desired, substantially as described.

2. In a magnetic brake the combination of an electro-magnet provided with poles; spring cushioning means adapted to support said magnet and poles in close proximity to, but out of contact with, a pair of car wheels running on track rails; pivoted dogs to positively hold said poles out of contact with said wheels in order to magnetize said wheels and rails through induction; and means to disengage said dogs and permit said poles to positively engage said wheels when a braking action is desired, substantially as described.

3. In an apparatus of the class described the combination of suitable track rails; a pair of wheels running on said rails; an electro-magnet provided with poles adapted to contact with said wheels; a pair of springs adapted to normally hold said poles out of contact with, but in close proximity to, said wheels; a pair of pivoted dogs adapted to positively hold said poles out of contact with said wheels when it is desired to magnetize said wheels and rails through induction; and a lever and a pair of rods for operating said dogs; substantially as described.

4. In an apparatus of the class described the combination of suitable track rails; a pair of wheels running on said rails; an electro-magnet provided with poles adapted to contact with said wheels; a pair of springs adapted to normally hold said poles out of contact with, but in close proximity to, said wheels; a pair of pivoted dogs adapted to positively hold said poles out of contact with said wheels when it is desired to magnetize said wheels and rails through induction; a lever and a pair of rods for operating said dogs; a rod on which said lever is pivoted; and a connection for rocking said last named rod and thereby operating said lever and dogs, substantially as described.

5. In a car truck the combination of a plurality of wheels adapted to run on suitable rails; a pair of electro-magnets having poles; a spring for each pole adapted to hold it in close proximity to, but out of contact with, said wheels; brackets for supporting said poles adapted to contact with said springs; pivoted dogs adapted to engage said brackets and prevent said poles from contacting with said wheels when it is desired to magnetize said wheels and rails through induction; rods connected to said dogs; a plurality of levers for said rods; a pivoting rod for rocking said levers; and an operating rod for rocking said pivoting rod, substantially as described.

In testimony whereof I affix my signature, in presence of two witnesses.

JOHN LOUIS EARL.

Witnesses:
J. RIESBOL,
A. M. COTTEN.